Jan. 6, 1953     A. CARO     2,624,431
LUGGAGE HANDLE
Filed July 9, 1948
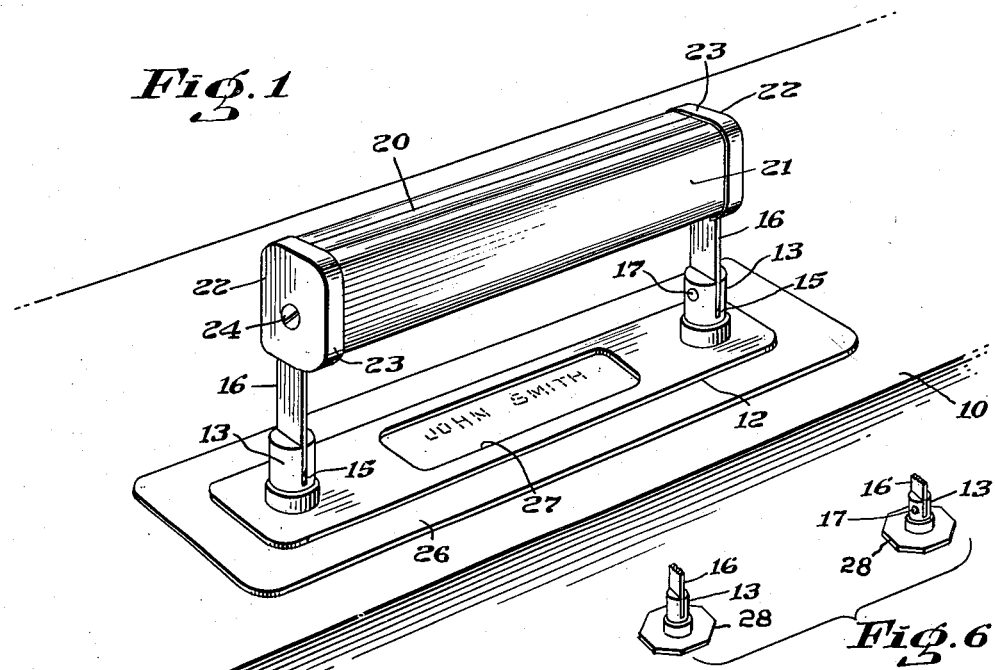
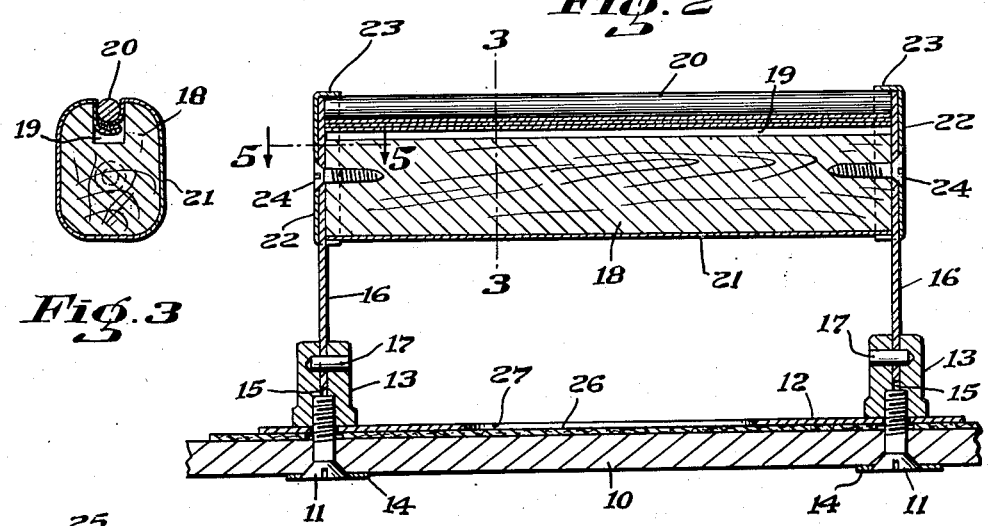
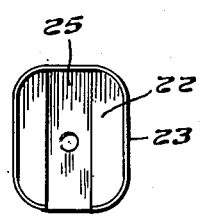
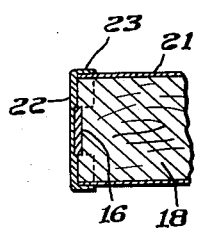
INVENTOR.
ABRAHAM CARO
BY
ATTORNEYS Patented Jan. 6, 1953

2,624,431

UNITED STATES PATENT OFFICE 2,624,431

LUGGAGE HANDLE

Abraham Caro, Dorchester, Mass.

Application July 9, 1948, Serial No. 37,785

5 Claims. (Cl. 190—58)

My present invention relates to luggage and particularly to handles therefor.

It has always been an objective in the manufacture of luggage, to provide handle structures that were adapted to withstand the strain of the weight of the luggage when full and at the same time would be attractive in appearance.

In accordance with my invention, I provide a handle consisting of a pair of standards anchored to the desired wall of the luggage and preferably clamping a plate thereagainst. One end of an arm is pivotally connected to each standard and these are so spaced that the other arm ends receive a handle element between them to the ends of which they are securely anchored. Where the handle element consists of a form having a covering layer locked thereto as by a spline member, the arms include flanged end caps dimensioned and shaped to embrace snugly a major part of the periphery of the end portions of the handle element thereby to protect the end edges of its covering layer and to lock the ends of the spline member in place.

In the accompanying drawings, I have shown an illustrative embodiment of my invention from which these and other of its novel features and advantages will be readily apparent.

In the drawings:

Fig. 1 is a view, in perspective, of a handle secured to a luggage wall.

Fig. 2 is a longitudinal vertical section through the handle and luggage wall of Fig. 1.

Fig. 3 is a section along the lines 3—3 of Fig. 2.

Fig. 4 is a view of the interior of one of the end caps.

Fig. 5 is a section along the lines 5—5 of Fig. 2, and

Fig. 6 is a fragmentary view showing a modification of the handle attaching means.

In the illustrative embodiment of my invention shown in the drawings, I have indicated at 10 the handle supporting wall of a suitcase of any desired construction or style. A pair of screws 11 extend through the wall 10, and through spaced apertures in a plate 12, and are threaded into standards 13 which serve as nuts to clamp the plate 12 tightly against the outer surface of the wall 10. On the inner surface of the wall 10, the thus established clamping pressure is suitably distributed by means of washers 14.

Each standard 13 is slotted as at 15 to receive one end of an arm 16, preferably of flat stock, which is pivotally mounted therein as by a pivot 17.

At 18, I have indicated a handle form, conveniently of wood, having a splineway 19 extending from end to end thereof along its top to receive a spline member 20 which locks in place the side edges of a form-covering material 21. The handle element is dimensioned to fit between the free ends of the arms 16 and its ends are preferably channeled to receive the arms. I provide a pair of end caps 22, each of which has a flange 23 of such size and shape as to embrace snugly the major portion of the periphery of an end of the handle element and to receive between its extremities the free end of one of the arms 16. Each end cap 22 and the free end of the arm 16 located therein are rigidly attached to an end of the handle form 18 as by a screw 24. When one of my handles is thus assembled, the end caps overlie the extremities of the handle element to protect the end edges of the covering material 21 and to lock in place the extremities of the spline member 20.

In practice, I form in the inner surfaces of each of the end caps 22 a channel 25, dimensioned and disposed relative to the extremities of the flange 23 to provide a seat for the end portion of the arm 16 that extends therein, as may be seen in Fig. 5.

As shown in the drawings, I may interpose a blank 26 of leather or other suitable stock between the plate 12 and the outer surface of the wall 10. This may conveniently be, for the purpose of attractive appearance of the luggage, of the same color as the form covering material 22 and other parts of the luggage. In practice, I prefer that the plate 12 be apertured as at 27 to enable the owner's name to be written or printed on that part of the blank 26 that is exposed thereby.

As shown in Fig. 6, where it is not desired to utilize the plate 26, it may be dispensed with and washer elements 28 substituted therefor to distribute the clamping pressure.

As the plate 12, the standards 13, the arms 16, the spline member 20, and the end caps 22 are of the same metal stock, it will be apparent that my invention provides handles for luggage that combine attractive appearance with structural strength.

What I therefore claim and desire to secure by Letters Patent is:

1. A handle structure comprising a handle element having channels in its ends, a pair of arms for attaching said handle element to an object, the outer end portions of said arms being of substantially the same widths as said channels and being disposed in the latter, respectively, cap members separate from said arms and covering the outer end portions of the latter and the ends, respectively, of said handle element, marginal flanges on said cap members embracing the end portions, respectively, of said handle element, said flanges having therein recesses of substantially the same widths as the outer end portions of said arms and through which the latter extend, and common means fastening said cap members and said arms against the ends of said handle element.

2. A handle structure comprising a handle element, a pair of arms for attaching said handle element to an object, the outer end portions of said arms overlying the ends, respectively, of said handle element, cap members separate from said arms and covering the outer end portions of the latter and the ends, respectively, of said handle element, marginal flanges on said cap members embracing the end portions, respectively, of said handle element, said flanges having therein recesses of substantially the same widths as said arms and through which said arms extend, and common means fastening said cap members and said arms against the ends of said handle element, said cap members having in their inner sides channels of substantially the same widths as the outer end portions of said arms and wherein the latter are disposed.

3. A handle structure comprising a handle element having channels in its ends, a pair of arms for attaching said handle element to an object, the outer end portions of said arms being of substantially the same widths as said channels and being disposed in the latter, respectively, cap members separate from said arms and covering the outer end portions of the latter and the ends, respectively, of said handle element, said cap members having channels of substantially the same widths as the outer end portions of said arms and wherein the latter are disposed, marginal flanges on said cap members embracing the end portions, respectively, of said handle element, said flanges having therein recesses of substantially the same widths as the outer end portions of said arms and through which the latter extend, and common means fastening said cap members and said arms against the ends of said handle element.

4. A handle structure comprising a handle element, a pair of arms for attaching said handle element to an object, the outer end portions of said arms lying against the ends, respectively, of said handle element, cap members separate from said arms and covering the outer end portions of the latter and the ends, respectively, of said handle element, marginal flanges on said cap members embracing the end portions, respectively, of said handle element, said flanges having therein recesses through which said arms extend, and common means fastening said cap members and said arms to said handle element.

5. A handle structure comprising a handle element, a pair of arms for attaching said handle element to an object, the outer end portions of said arms lying against the ends, respectively, of said handle element, cap members separate from said arms and covering the outer end portions of the latter and the ends, respectively, of said handle element, marginal flanges on said cap members embracing the end portions, respectively, of said handle element, the end portions of said handle element and said flanges being of corresponding non-circular shape to prevent rotation of said cap members relative to said handle element, said flanges having therein recesses through which said arms extend, said recesses being of substantially the same width as said arms whereby rotation of said handle element relative to said arms is prevented, and common means fastening said members and said arms to said handle element.

ABRAHAM CARO.

REFERENCES CITED

The following references are of record in the file of this patent:

UNITED STATES PATENTS

| Number | Name | Date |
|---|---|---|
| 317,114 | Goertz | May 5, 1885 |
| 928,619 | Wood | July 20, 1909 |
| 1,019,799 | Keily | Mar. 12, 1912 |
| 1,403,167 | Kahlow | Jan. 10, 1922 |
| 2,060,225 | Laskin | Nov. 10, 1936 |
| 2,168,077 | Wheary | Aug. 1, 1939 |
| 2,176,857 | Hamlin | Oct. 17, 1939 |

FOREIGN PATENTS

| Number | Country | Date |
|---|---|---|
| 268,579 | Great Britain | Apr. 7, 1927 |
| 411,700 | France | Apr. 16, 1910 |